W. DRYER.
ADJUSTABLE BRUSH AND WEED CUTTER.
APPLICATION FILED JUNE 11, 1920.

1,357,855.

Patented Nov. 2, 1920.

Inventor
William Dryer
by Wilkinson & Giusta.
Attorneys

UNITED STATES PATENT OFFICE.

WILLIAM DRYER, OF TOPEKA, KANSAS.

ADJUSTABLE BRUSH AND WEED CUTTER.

1,357,855.   Specification of Letters Patent.   Patented Nov. 2, 1920.

Application filed June 11, 1920. Serial No. 388,290.

*To all whom it may concern:*

Be it known that I, WILLIAM DRYER, a citizen of the United States, residing at Topeka, in the county of Shawnee and State of Kansas, have invented certain new and useful Improvements in Adjustable Brush and Weed Cutters; and I do hereby declare the following to be a full, clear, and exact description of the invention, such as will enable others skilled in the art to which it appertains to make and use the same.

The present invention relates to improvements in adjustable brush and weed cutters, and has for an object to provide an implement of this character in which the adjustment may be made with facility and the implement put in condition for the expeditious cutting of brush and of weeds around plants, or any other places inaccessible to scythes, lawn mowers, or other larger machines or tools.

Another object of the invention resides in providing an improved brush and weed cutter having a handle with a D head and with improved attaching means whereby the latter may be secured to either end of the blade and permitting of the attachment of the handle at different angular positions in order to change the direction of thrust upon the blade.

A further object of the invention lies in providing a simple and inexpensive brush and weed cutter in which the adjustments may be made easily and quickly.

In the accompanying drawings forming a part of this application, and in which similar reference symbols indicate corresponding parts in the several views.

Figure 1:
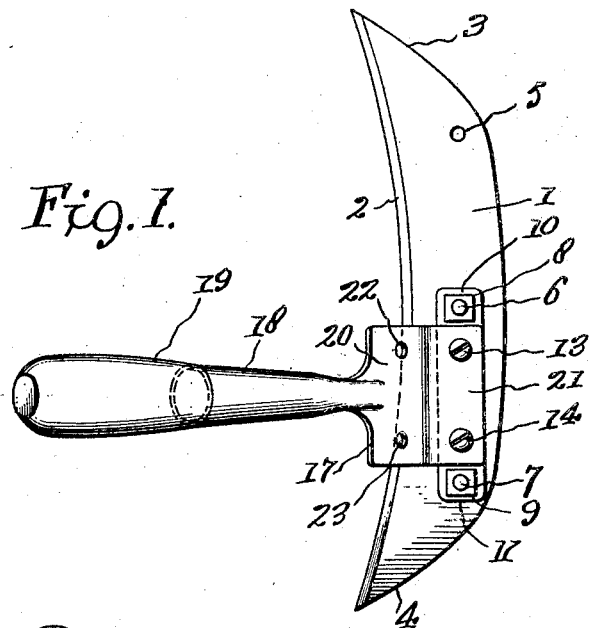
Figure 1 is a plan view of an improved adjustable brush and weed cutter constructed according to the present invention.
Figure 2:
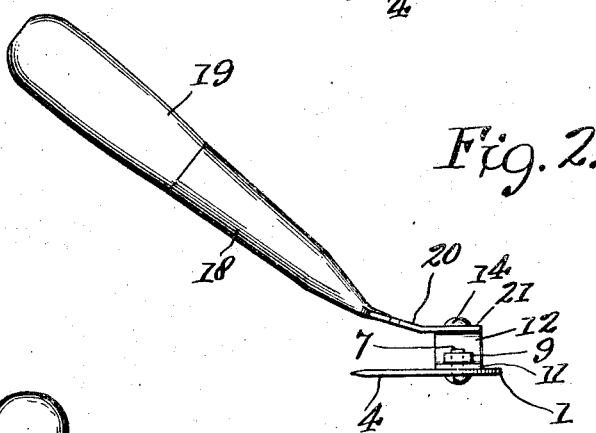
Fig. 2 is an edge view thereof.
Figure 3:
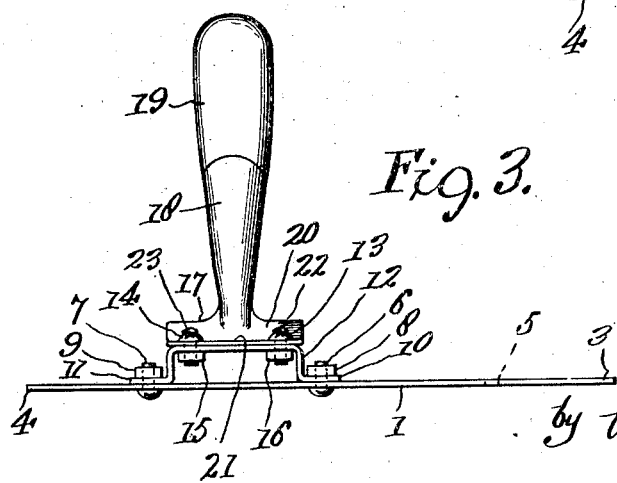
Fig. 3 is a front view of the same.

Referring more particularly to the drawings, 1 designates the blade of the improved weed cutter, which is also referred to in the trade as a hook, having the cutting edge 2 which is preferably curved substantially in the manner indicated in Fig. 1. While this blade may be of any suitable dimensions and made of appropriate material, it will be found preferable to manufacture it from steel 3 3/4 inches wide by 14 inches long and 1/8 of an inch thick.

The blade is provided with openings 3 and 4 to reduce the length at this point in order that the cutting edge may enter small spaces which would be inaccessible to the longer portions of the blade. In the blade are also made openings 5, which are three in number and preferably placed at equidistant spaces apart; one of such openings being preferably in the center of the blade 1.

The openings 5 are adapted to receive bolts 6 and 7 to which nuts 8 and 9 are attached, the bolts going through the blade and tabs or ears 10 and 11 on a U-shaped clip 12. The bolts 6 and 7 are removable from the tabs or ears 10 and 11 and from the openings 5 by unscrewing the nuts 8 or 9 therefrom. The clip 12 in this manner may be placed at either side of the blade 1, it being merely necessary to remove the side bolt 7, the other bolt 6 acting as a center on which the clip 12 may be rotated through 180° to bring it to the opposite end of said blade, whereupon the bolt 7 may be reinserted in the opposite opening 5.

The clip 12 is also preferably made from steel of suitable dimensions, preferably one inch wide by 5/16 of an inch thick. The clip 12 is used to attach the handle, and for this purpose is provided with a pair of openings to receive a second pair of bolts 13 and 14 having nuts 15 and 16 for removably securing to the clip a handle attaching plate 17. The plate has a socket 18 in which to receive the handle 19, with a D head being of any length desired. The attaching plate 17 is preferably made of two sections 20 and 21 disposed at different angular positions, and each being provided with pairs of openings 22 and 23.

In the drawings the bolts 13 and 14 are shown as engaged with a pair of openings in the lower section 21 which thrust the blade downward at a greater inclination to the ground. This is advantageous in cutting small weeds close to the surface of the ground and avoids the stooping which otherwise would result were the blade in a higher position. The bolts 13 and 14 may be removed, however, to allow of the upper section 20 of the attaching plate being fastened to the clip 12, in which case the blade is disposed at a higher elevation and nearer a parallel position with the handle 19. In this case the thrust is, of course, more direct, and it is therefore suitable for the cutting of heavy brush and large weeds.

The handle 19 with a D head may be sufficiently long so that the operator may stand in an erect position, the adjustment from the plate sections 20 and 21 in accordance with the character of the weeds to be cut. It is also desirable at times to shift the handle from the one to the other end of the blade, and this is accomplished by the swinging of the U-shaped clip 12 in the manner as hereinbefore described. This adjustment allows the implement to be operated with facility both by the right and left hands, and also gives accessibility to oppositely positioned spaces having little headway.

It is obvious that those skilled in the art may vary the details of construction and arrangements of parts without departing from the spirit of my invention, and therefore I do not wish to be limited to such features except as may be required by the claims.

I claim:

1. A brush and weed cutter comprising a blade, a clip having means to attach it to opposite sides of the center of said blade, and a handle adapted to be attached in different angular relations to said clip, substantially as described.

2. An improved adjustable brush and weed cutter comprising an elongated thin flat blade having curved ends and provided with a curved cutting edge toward the operator, said blade also having openings therein, a clip, means to attach said clip in the openings whereby the clip may swing from one end of the transverse center of the blade to the opposite end thereof, a handle attaching blade having a pair of adjoining sections disposed in different angular relations, means whereby said sections may be attached to said clip, and a handle connected to said plate, substantially as described.

WILLIAM DRYER.